US010974986B2

(12) United States Patent
Hirose et al.

(10) Patent No.: US 10,974,986 B2
(45) Date of Patent: Apr. 13, 2021

(54) ALKALI-FREE GLASS SUBSTRATE

(71) Applicant: AGC INC., Chiyoda-ku (JP)

(72) Inventors: Motoyuki Hirose, Tokyo (JP); Takashi Enomoto, Tokyo (JP)

(73) Assignee: AGC INC., Chiyoda-ku (JP)

( * ) Notice: Subject to any disclaimer, the term of this patent is extended or adjusted under 35 U.S.C. 154(b) by 207 days.

(21) Appl. No.: 16/135,682

(22) Filed: Sep. 19, 2018

(65) Prior Publication Data

US 2019/0084860 A1 Mar. 21, 2019

(30) Foreign Application Priority Data

Sep. 20, 2017 (JP) .............................. JP2017-179684

(51) Int. Cl.
| | | |
|---|---|---|
| *C03C 3/085* | (2006.01) | |
| *C03C 3/087* | (2006.01) | |
| *C03C 3/11* | (2006.01) | |
| *C03B 5/225* | (2006.01) | |
| *C03C 3/091* | (2006.01) | |
| *C03C 3/078* | (2006.01) | |
| *C03B 5/235* | (2006.01) | |

(52) U.S. Cl.
CPC ............ *C03C 3/085* (2013.01); *C03B 5/2252* (2013.01); *C03C 3/078* (2013.01); *C03C 3/087* (2013.01); *C03C 3/091* (2013.01); *C03C 3/11* (2013.01); *C03B 5/2353* (2013.01); *C03C 2203/10* (2013.01)

(58) Field of Classification Search
CPC ......... C03C 3/078; C03C 3/087; C03C 3/091; C03C 3/11; C03C 2203/10; C03B 5/2252; C03B 5/2353
See application file for complete search history.

(56) References Cited

U.S. PATENT DOCUMENTS

| 6,169,047 | B1* | 1/2001 | Nishizawa | C03C 3/091 428/428 |
|---|---|---|---|---|
| 2002/0011080 | A1* | 1/2002 | Naka | C03C 3/091 65/66 |
| 2011/0079049 | A1* | 4/2011 | Ellison | C03C 3/091 65/90 |
| 2014/0377525 | A1* | 12/2014 | Kawaguchi | C03C 3/091 428/220 |
| 2018/0141849 | A1* | 5/2018 | Saito | C03C 3/11 |
| 2018/0148367 | A1* | 5/2018 | Hayashi | C03C 3/087 |
| 2019/0084860 | A1* | 3/2019 | Hirose | C03C 3/078 |
| 2020/0140314 | A1* | 5/2020 | Tomamoto | C03B 17/064 |
| 2020/0165155 | A1* | 5/2020 | Saito | H01L 51/524 |

FOREIGN PATENT DOCUMENTS

| WO | WO 2008/093580 A1 | 8/2008 | | |
|---|---|---|---|---|
| WO | WO-2016194693 A1 * | 12/2016 | ............ | C03C 3/091 |

OTHER PUBLICATIONS

Tanaka, C "Glass Melting Friendly to Environment: Especially on Technological Removal of Bubbles", New Glass 83, vol. 21, No. 4, 2006, pp. 31-36 with translation.
Takei, Y et al. "Refining under sub-atmospheric pressures and its effect on energy saving", New Glass, vol. 15, No. 2 , 2000, pp. 51-55 with translation.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention relates to an alkali-free glass substrate in which when the alkali-free glass substrate is melted, and while holding a temperature at 1400° C., reduced in pressure from an atmospheric pressure to 33.33 kPa at a constant pressure reduction rate for 20 minutes and held at 33.33 kPa for 5 minutes, a diameter of a grown bubble is at least 3 times a diameter of an initial bubble. A bubble having a diameter of 0.1 to 0.3 mm contained in a molten glass at 1400° C. before starting pressure reduction is defined as the initial bubble. A bubble after held at 33.33 kPa for 5 minutes corresponding to the initial bubble is defined as a grown bubble.

9 Claims, 2 Drawing Sheets

ALKALI-FREE GLASS SUBSTRATE

TECHNICAL FIELD

The present invention relates to an alkali-free glass substrate suitable as a glass substrate for various displays.

BACKGROUND ART

An alkali-free glass substrate which does not substantially contain alkali metal ions is preferably used for a glass substrate for various displays, particularly one in which a metal, an oxide thin film or the like is formed on a surface thereof, because when an alkali metal oxide is contained, the alkali metal ions diffuse in the thin film to deteriorate film properties.

A glass raw material prepared at a predetermined compounding ratio is melted in a melting tank to be vitrified, the molten glass is fined and thereafter formed into a glass ribbon having a predetermined sheet thickness by a float process or a fusion process, and this glass ribbon is cut into a predetermined shape, thereby obtaining the alkali-free glass substrate used for the purpose described above.

In the refining of the molten glass, there has been known a vacuum degassing method of introducing the molten glass into a reduced pressure atmosphere, allowing bubbles in a continuous flow of molten glass to largely grow under the reduced pressure atmosphere to raise the bubbles contained in the molten glass, breaking and removing the bubbles, and thereafter, discharging the molten glass from the reduced pressure atmosphere. For example, Patent Document 1 discloses a glass production method comprising a step of subjecting molten glass to vacuum degassing in a vacuum degassing vessel.

PRIOR ART DOCUMENTS

Patent Document

Patent Document 1: WO2008/093580

Non-Patent Document

Non-Patent Document 1: Chikao Tanaka "Glass Melting Friendly to Environment: Especially on Technological Removal of Bubbles", New Glass 83, vol. 21, No. 4 (2006), pages 31 to 36

SUMMARY OF THE INVENTION

Problems that the Invention is to Solve

In recent years, the demand for an increase in size of a liquid crystal display has been increased, and an increase in size of a glass substrate used in the liquid crystal display has been desired. In order to efficiently produce a large-sized glass substrate, it sometimes becomes necessary to increase the size of a vacuum degassing apparatus. In particular, when a molten glass conduit (a vacuum degassing vessel, an uprising pipe or a downfalling pipe) made of platinum or a platinum alloy is used in the vacuum degassing apparatus, there is a problem of increasing equipment cost.

In addition, for the glass substrate, even when an average density of a bubble defect in the substrate is the same, a product yield decreases as the substrate size increases (see the figure of Non-Patent Document 1). For this reason, in order to increase the size of the glass substrate to be produced, it is more necessary than ever to reduce the bubble density in the substrate.

In order to solve the problems described above, an object of the present invention is to provide an alkali-free glass substrate in which a bubble contained in a molten glass can be removed easily under a reduced pressure atmosphere.

Means for Solving the Problems

In order to achieve the object described above, the present invention provides an alkali-free glass substrate in which when the alkali-free glass substrate is melted, and while holding a temperature at 1400° C., reduced in pressure from an atmospheric pressure to 33.33 kPa at a constant pressure reduction rate for 20 minutes and held at 33.33 kPa for 5 minutes, a diameter of a grown bubble is at least 3 times a diameter of an initial bubble, wherein a bubble having a diameter of 0.1 to 0.3 mm contained in a molten glass at 1400° C. before starting pressure reduction is defined as the initial bubble, and a bubble after held at 33.33 kPa for 5 minutes corresponding to the initial bubble is defined as a grown bubble.

Advantageous Effects of the Invention

According to an alkali-free glass substrate of the present invention, a bubble contained in a molten glass can be easily removed under a reduced pressure atmosphere.

MODE FOR CARRYING OUT THE INVENTION

Alkali-Free Glass Substrate

Figure 1:
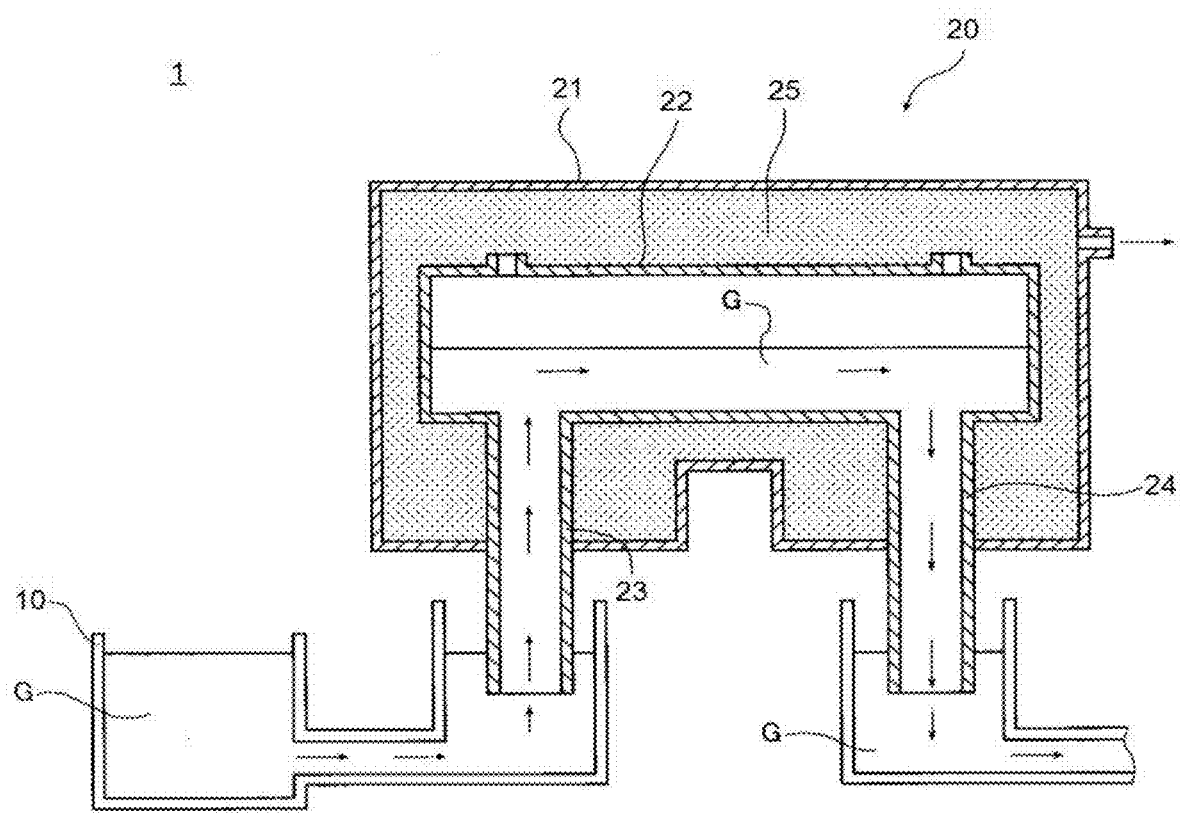
FIG. 1 is a cross-sectional view showing a configuration example of a glass production apparatus used for producing an alkali-free glass substrate of the present invention.

An alkali-free glass substrate according to an embodiment of the present invention will be described below. Alkali-free glass is glass which does not substantially contain alkali metal oxides such as $Na_2O$ and $K_2O$. The term "does not substantially contain alkali metal oxides" means that the total content of the alkali metal oxides is 0.1 mass % or less.

The present invention is an alkali-free glass substrate in which when the alkali-free glass substrate is melted, and while holding a temperature at 1400° C., reduced in pressure from an atmospheric pressure to 33.33 kPa at a constant pressure reduction rate for 20 minutes and held at 33.33 kPa for 5 minutes, a diameter of a grown bubble is at least 3 times a diameter of an initial bubble, wherein a bubble having a diameter of 0.1 to 0.3 mm contained in a molten glass at 1400° C. before starting pressure reduction is defined as the initial bubble, and a bubble after held at 33.33 kPa for 5 minutes corresponding to the initial bubble is defined as a grown bubble.

In the present invention, the diameter of the initial bubble and the diameter of the grown bubble are determined by the following procedure.

A silica cell containing cullet of the alkali-free glass substrate is put in a vacuum pressure reducing vessel. The silica cell is heated to 1400° C. to melt the cullet, and thereafter, the pressure in the vacuum pressure reducing vessel is reduced. A bubble contained in the molten glass is photographed using a CCD camera from a sight window provided on the vacuum pressure reducing vessel, and the diameter of the bubble (hereinafter referred to as a bubble diameter) is measured by image analysis. It is unnecessary to measure the bubble diameter for all of a plurality of bubbles observed by an image. Specifically, the bubble adhered to a wall surface of the silica cell, bubble of a plurality of bubbles combined with each other, and the like are excluded from measurement objects. A ratio of the diameter of the grown bubble to the diameter of the initial bubble (hereinafter referred to as a bubble growth rate) in the embodiment of the present invention is obtained by calculating the bubble growth rate for the plurality of bubbles observed by the image, respectively, and determining an average value thereof.

When the pressure in the vacuum pressure reducing vessel is reduced, the diameter of the bubble contained in the molten glass is increased according to the Boyle's law. However, when the pressure in the vacuum pressure reducing vessel is reduced to a certain pressure, the diameter of the bubble contained in the molten glass is rapidly increased out of the Boyle's law. This pressure is called a bubble growth starting pressure.

In the production of the alkali-free glass substrate, it is said that the bubble growth starting pressure is preferably from 13.33 to 53.33 kPa. When the bubble growth starting pressure is 13.33 kPa or more, reboiling is prevented from being generated in the molten glass flowing in the vacuum degassing vessel. The term "reboiling" as used herein refers to a phenomenon that a bubble is generated on a glass interface in contact with the melting degassing vessel made of platinum, a platinum alloy or a dense refractory. When the bubble growth starting pressure is 53.33 kPa or less, the bubble contained in the molten glass can be sufficiently grown and can be efficiently removed. Then, in the present invention, the molten glass is reduced in pressure to 33.33 kPa, and the growth of the bubble diameter is evaluated.

The pressure reducing condition for the evaluation is that the pressure is reduced from the atmospheric pressure to 33.33 kPa at a constant pressure reduction rate for 20 minutes. When the pressure reducing time is 20 minutes, the growth of the bubble diameter can be properly evaluated while shortening the evaluation time.

As the initial bubble, a bubble having a bubble diameter of 0.1 to 0.3 mm is selected. When the initial bubble has a diameter of 0.1 mm or more, it becomes easy to measure the bubble diameter using the CCD camera. When the initial bubble has a diameter of 0.3 mm or less, the grown bubble can be prevented from being enlarged to cause bubble breakage. Therefore, the growth of the bubble diameter can be properly evaluated.

In the present invention, the bubble after held at 33.33 kPa for 5 minutes corresponding to the initial bubble is defined as the grown bubble. When the holding time is 5 minutes, the grown bubble becomes sufficiently large to the initial bubble, and the bubble can be prevented from being enlarged to cause bubble breakage. Therefore, the growth of the bubble diameter can be properly evaluated.

In the present invention, the grown bubble has a diameter of at least 3 times the diameter of the initial bubble. In the present invention, the grown bubble has a diameter of preferably at least 5 times and more preferably at least 7 times the diameter of the initial bubble. When the grown bubble has a diameter of at least 3 times the diameter of the initial bubble, the bubble contained in the molten glass is easily grown and easily raised in the molten glass under a reduced pressure atmosphere. Therefore, the bubble contained in the molten glass can be easily removed.

In the present invention, the grown bubble has a diameter of preferably not more than 20 times, more preferably not more than 15 times, and still more preferably not more than 13 times the diameter of the initial bubble. In the case of not more than 20 times, a bubble layer, which is usually present with a thickness of about 10 mm or less, on a surface of the molten glass can be suppressed from being enlarged to a thickness of 10 to several hundred mm, during vacuum degassing treatment. Therefore, passing through of a bubble can be prevented. The term "passing through of a bubble" as used herein means a phenomenon that the bubble having reached the glass surface form a bubble layer without being broken, thereby being stably present for a long period of time, and a bubble rising later flow out to a subsequent step as they are without being broken. The occurrence of the passing through of the bubble causes a problem that the bubble remains in the molten glass after the vacuum degassing.

In the alkali-free glass substrate of the present invention, the substrate preferably has a short side of 2100 mm or larger and a long side of 2400 mm or larger, more preferably a short side of 2800 mm or larger and a long side of 3000 mm or larger, and still more preferably a short side of 2900 mm or larger and a long side of 3200 mm or larger. It is necessary to decrease the bubble density in the substrate as the substrate size increases. However, in the alkali-free glass substrate of the present invention, the product yield is less likely to decrease even when the substrate size is large, because of its low bubble density, and therefore, is suitable when the substrate size is large.

In the alkali-free glass substrate of the present invention, a density of the bubble having a diameter of more than 100 μm is preferably 0.06 bubbles/kg or less, and more preferably 0.01 bubbles/kg or less.

The alkali-free glass substrate of the present invention is preferably a float glass, because a float process is superior in taking a glass substrate having a large substrate size to a fusion process.

In the alkali-free glass substrate of the present invention, a β-OH value is preferably from 0.15 to 0.5 mm$^{-1}$, more preferably from 0.25 to 0.5 mm$^{-1}$, and still more preferably from 0.35 to 0.5 mm$^{-1}$. The β-OH value is used as an index of the water content in the glass. When the β-OH value is 0.15 mm$^{-1}$ or more, water in the glass flows into the bubble under the reduced pressure atmosphere, and the bubble easily grows. In particular, when the β-OH value is 0.35 mm$^{-1}$ or more, the growth of the bubble becomes active. In addition, when the β-OH value is 0.5 mm$^{-1}$ or less, the growth of the bubble can be suppressed from being excessively enhanced, and therefore, during the vacuum degassing treatment, the occurrence of the passing through of bubble caused by the enlargement of the bubble layer can be suppressed.

The β-OH value is determined by measuring a transmittance of an alkali-free glass test piece obtained by forming the molten glass after the vacuum degassing into a sheet shape, using a Fourier transform infrared spectrophotometer (FT-IR), and using the following formula.

$$\beta\text{-OH} = (1/X)\log_{10}(T_1/T_2)$$

X: Glass sheet thickness (mm)
$T_1$: Transmittance (%) at a reference wave number of 4000 cm$^{-1}$
$T_2$: Minimum transmittance (%) around a hydroxyl group absorption wave number of 3570 cm$^{-1}$ The β-OH value is controlled by the water content in a glass raw material, atmospheric water concentration in a melting tank, a burner combustion method (oxygen combustion or air combustion) in the melting tank and the like. In particular, the β-OH value can be simply adjusted by adjusting the burner combustion method. Specifically, in order to increase the β-OH value, the oxygen combustion ratio of the burner combustion is increased, and in order to decrease the β-OH value, the air combustion ratio of the burner combustion is increased.

In the alkali-free glass substrate of the present invention, a Cl content to a matrix composition of the glass is preferably from 0.1 to 0.35 mass %, and more preferably from 0.2 to 0.35 mass %. Here, Cl in the glass is a component which makes it easy to grow the bubble contained in the molten glass. When the Cl content is less than 0.1 mass %, the growth of the bubble tends to become insufficient. When the Cl content is more than 0.35 mass %, the bubble layer is easily formed by the enlargement of the bubble layer during the vacuum degassing treatment.

In the alkali-free glass substrate of the present invention, a strain point is preferably 650° C. or higher, because thermal shrinkage during panel production is suppressed. In the alkali-free glass substrate of the present invention, the strain point is more preferably 670° C. or higher, and still more preferably 680° C. or higher.

The alkali-free glass substrate of the present invention preferably contains, as represented by mass % based on oxides, $SiO_2$: 54 to 66%,
$Al_2O_3$: 10 to 23%,
$B_2O_3$: 0 to 12%,
MgO: 0 to 12%,
CaO: 0 to 15%,
SrO: 0 to 16%,
BaO: 0 to 15%, and
MgO+CaO+SrO+BaO: 8 to 26%.

The alkali-free glass substrate of the present invention more preferably contains 5% or less of $B_2O_3$ as represented by mass % based on oxides.

The alkali-free glass substrate of the present invention may contain $Fe_2O_3$ as a trace component. The $Fe_2O_3$ content is preferably 0.1 mass % or less.

In the alkali-free glass substrate of the present invention, a sheet thickness thereof is preferably 0.75 mm or less, as an application of a glass substrate for liquid crystal displays.

In the alkali-free glass substrate of the present invention, the sheet thickness thereof is more preferably 0.55 mm or less, and still more preferably 0.45 mm or less.

Method for Producing Alkali-Free Glass Substrate

A method for producing the alkali-free glass substrate of the present invention is described below with reference to the drawing. FIG. 1 is a cross-sectional view showing a configuration example of a glass production apparatus used for producing the alkali-free glass substrate of the present invention.

The glass production apparatus 1 includes a melting tank 10 and a vacuum degassing apparatus 20. A forming device such as a float bath is arranged in succession to the vacuum degassing apparatus 20. The forming device may be a forming device used in a down-draw process.

In the method for producing the alkali-free glass substrate, molten glass G is prepared by melting the glass raw material in the melting tank 10, and the molten glass G is subjected to vacuum degassing treatment in the vacuum degassing apparatus 20. A band plate-shaped glass ribbon formed by the forming device is annealed and cut to obtain the alkali-free glass substrate.

The melting tank 10 includes burners for melting the glass raw material supplied. The burners mix fuel such as natural gas or heavy oil with gas for combustion to form a flame. The burner mainly using air as the gas is referred to as an air combustion burner, and the burner mainly using oxygen as the gas is referred to as an oxygen combustion burner. The burners heat the glass raw material from above by radiating the flame toward the glass raw material.

As the glass raw material, silica sand, boric acid, limestone, aluminum oxide, strontium carbonate, magnesium oxide and the like are used, and are blended so as to achieve a composition of the desired alkali-free glass substrate.

A chloride-based refining agent is preferably added to the glass raw material. As the chloride-based refining agent, $BaCl_2 \cdot 2H_2O$, $SrCl_2 \cdot 6H_2O$, $CaCl_2$, $MgCl_2 \cdot 6H_2O$ or $NH_4Cl$ is preferred from the viewpoint of having no fear of deliquescence.

In order to appropriately adjust the bubble growth rate, a refining agent other than the chloride-based refining agent may be used. In this case, examples of the other refining agent include $SO_3$, F, $SnO_2$ and the like. For these other refining agents, the content thereof in the glass raw material is preferably 2 mass % or less, more preferably 1 mass % or less, and still more preferably 0.5 mass % or less, The vacuum degassing apparatus 20 includes a vacuum housing 21, a vacuum degassing vessel 22, an uprising pipe 23, a downfalling pipe 24 and a heat insulating material 25.

The cylindrical vacuum degassing vessel 22 is housed and arranged in the vacuum housing 21 so that a major axis thereof is oriented in a horizontal direction. The uprising pipe 23 oriented in a vertical direction is attached to a lower surface of one end of the vacuum degassing vessel 22, and the downfalling pipe 24 is attached to a lower surface of the other end thereof. Parts of the uprising pipe 23 and the downfalling pipe 24 are positioned in the vacuum housing 21.

The uprising pipe 23 is communicated with the vacuum degassing vessel 22, and introduces the molten glass G from the melting tank 10 to the vacuum degassing vessel 22. The downfalling pipe 24 is communicated with the vacuum degassing vessel 22, and leads out the molten glass G after vacuum degassing to a subsequent treatment vessel. In the vacuum housing 21, around the vacuum degassing vessel 22, the uprising pipe 23 and the downfalling pipe 24, a heat insulating material 25 such as heat-insulating brick for applying heat-insulating coating on them is arranged.

The vacuum degassing vessel 22, the uprising pipe 23 and the downfalling pipe 24 are conduits for the molten glass, and therefore, are prepared using a material excellent in heat resistance and corrosion resistance to the molten glass. For example, they are made of platinum, a platinum alloy or reinforced platinum in which a metal oxide is dispersed in platinum or a platinum alloy. Furthermore, they may be made of a ceramic-based nonmetallic inorganic material, that is, a dense refractory. The dense refractory may be lined with platinum or a platinum alloy.

In the vacuum degassing method, the molten glass G supplied from the melting tank 10 is allowed to pass through the vacuum degassing vessel 22 in which the pressure is reduced to a predetermined pressure, thereby performing the vacuum degassing. The molten glass G is preferably continuously supplied to and discharged from the vacuum degassing vessel 22. The flow rate of the molten glass G is preferably from 1 to 200 tons/day from the viewpoint of productivity.

In order to prevent the occurrence of a temperature difference from the molten glass G supplied from the melting tank 10, the vacuum degassing vessel 22 is preferably heated within a temperature range of 1200 to 1600° C., particularly 1350 to 1550° C.

When the vacuum degassing is performed, air in the vacuum housing 21 is exhausted by a vacuum pressure reducing means such as a vacuum pump from the outside through a suction opening part provided at a predetermined position of the vacuum housing 21. Air in the vacuum degassing vessel 22 housed in the vacuum housing 21 is indirectly exhausted thereby, and the pressure in the vacuum degassing vessel 22 is reduced to the predetermined pressure.

The pressure in the vacuum degassing vessel 22 is preferably from 13.33 to 53.33 kPa, as with the preferred range of the bubble growth starting pressure.

EXAMPLES

The present invention will be further described below with reference to Examples and Comparative Examples, but the present invention should not be construed as being limited to these descriptions.

Experimental Example 1

Using the glass production apparatus 1 shown in FIG. 1, molten glass G was prepared by melting the glass raw material of an alkali-free glass composition in the melting tank 10, and the molten glass G was subjected to vacuum degassing treatment in the vacuum degassing apparatus 20. The molten glass was formed into a band plate-shaped glass ribbon by a float process, and the glass ribbon was annealed and cut to obtain an alkali-free glass substrate having a sheet thickness of 0.50 mm (Example 1 and Comparative Example 1).

The glass composition of Example 1 was, as represented by mass % based on oxides, $SiO_2$: 59.8%, $Al_2O_3$: 17.2%, $B_2O_3$: 7.8%, MgO: 3.1%, CaO: 4.1%, SrO: 7.7%, BaO: 0.1% and a Cl content to the matrix composition of the glass was 0.2 mass %.

The glass composition of Comparative Example 1 was, as represented by mass % based on oxides, $SiO_2$: 62%, $Al_2O_3$: 18%, $B_2O_3$: 9.5%, MgO: 2%, CaO: 7%, SrO: 1.2%, BaO: 0.1% and $SnO_2$: 0.2%.

The glass composition of Example 1 did not contain $SnO_2$, different from the glass composition of Comparative Example 1.

In order to reproduce an atmosphere for performing vacuum degassing, a silica cell containing 50 g of cullet of the alkali-free glass substrate was disposed in a vacuum pressure reducing vessel. An HTO (High Temperature Observation) furnace manufactured by Glass Service, Inc. was used as the vacuum pressure reducing vessel. The silica cell was heated from room temperature to 1400° C. to melt the cullet, and thereafter, pressure reduction in the vacuum pressure reducing vessel was started. The pressure was reduced from the atmospheric pressure to 33.33 kPa at a constant pressure reduction rate for 20 minutes, while holding the inside of the vacuum pressure reducing vessel at 1400° C., and held at 33.33 kPa for 10 minutes. During this time, a bubble contained in molten glass was photographed using a CCD camera from a sight window provided on the vacuum pressure reducing vessel, at 0, 3, 6, 9, 12, 15, 18, 20, 21, 22, 23, 24, 25, 26, 27, 28, 29 and 30 minutes, taking the pressure reduction starting time as 0 minutes, and the diameter of the bubble was measured by image analysis. In this example, the bubble at 0 minutes was the initial bubble, and the bubble at 25 minutes from the pressure reduction starting time was the grown bubble.

Figure 2:
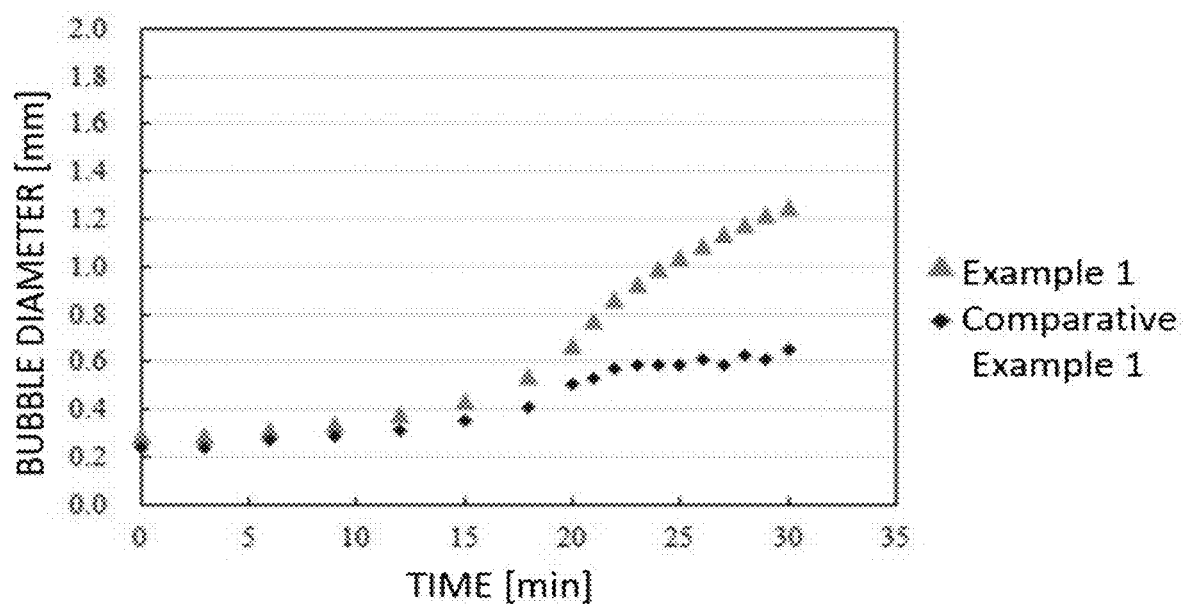
FIG. 2 is a graph showing changes in bubble diameter with time under reduced pressure conditions of the present invention.

FIG. 2 is a graph showing changes in bubble diameter with time under reduced pressure conditions of the present invention. When Example 1 and Comparative Example 1 are compared with each other, it is shown that the bubble diameter is more largely grown in Example 1 than in Comparative Example 1, during held at 33.33 kPa. In Example 1, the diameter of the initial bubble was 0.29 mm, and the diameter of the grown bubble was 1.04 mm. The diameter of the grown bubble was 3.6 times the diameter of the initial bubble. On the other hand, in Comparative Example 1, the diameter of the initial bubble was 0.24 mm, and the diameter of the grown bubble was 0.59 mm. The diameter of the grown bubble was 2.5 times the diameter of the initial bubble. According to the alkali-free glass substrate of Example 1, it was shown that the bubble contained in the molten glass could be easily removed under the reduced pressure atmosphere.

Experimental Example 2

A refining effect of molten glass in a vacuum degassing vessel was evaluated by simulation. The rising speed at which a bubble in a flow of the molten glass is grown and raised in the molten glass is associated by the bubble diameter and the Stokes' equation. Then, in the simulation, the bubble diameter was calculated based on the bubble growth rate, and a bubble rising behavior was analyzed based on the Stokes' equation. The calculation was performed, considering the bubble to be generated at a bottom of an upstream end of the vacuum degassing vessel, and setting the diameter of the initial bubble to 0.2 mm.

The size of the vacuum degassing vessel and the height of a liquid level of the molten glass were as follows, respectively.

Horizontal length in the vacuum degassing vessel: 10 m
Inner diameter of the vacuum degassing vessel: 500 mm
Height of the liquid level of the molten glass: 250 mm
The molten glass passing through the vacuum degassing vessel was considered as follows:
Glass: The matrix composition of the glass was the same as in Example 1, and the Cl content was from 0 to 0.35 mass %.
Flow rate: 0.6 $m^3$/h or 1.8 $m^3$/h
Temperature (average) during passing through the vacuum degassing vessel: 1400° C.
Viscosity during passing through the vacuum degassing vessel: 151 Pa·s
Density during passing through the vacuum degassing vessel: 2380 kg/$m^3$ For the degassing performance, the distance (longest rising distance) of a site where the bubble finally rose, from the upstream end of the vacuum degassing vessel was evaluated. The smaller the longest rising distance is, the more excellent the degassing performance is.

The results thereof are shown in Table 1. Table 1 shows the glass flow rate, the β-OH value, the Cl content, the bubble growth rate and the longest rising distance. No. 2 to 4, 6, 7, 9, 11 to 13 correspond to Examples, and No. 1, 5, 8 and 10 correspond to Comparative Examples. The cases where the longest rising distance is equal to or smaller than the horizontal length (10 m) in the vacuum degassing vessel correspond to Examples, and the cases where the longest rising distance is more longer than 10 m correspond to Comparative Examples. The bubble growth rate was measured under the same conditions as in Experimental Example 1.

TABLE 1

|  | Flow rate (m³/h) | β-OH (mm⁻¹) | Cl content (%) | Bubble growth rate | Longest rising distance (m) |
| --- | --- | --- | --- | --- | --- |
| No. 1 | 0.6 | 0.45 | 0 | 1.8 | longer than 10 |
| No. 2 | 0.6 | 0.45 | 0.15 | 12.5 | 2 |
| No. 3 | 0.6 | 0.35 | 0.15 | 6.9 | 4 |
| No. 4 | 0.6 | 0.35 | 0.25 | 11.1 | 3 |
| No. 5 | 0.6 | 0.25 | 0.15 | 2.0 | longer than 10 |
| No. 6 | 0.6 | 0.25 | 0.25 | 5.3 | 5 |
| No. 7 | 0.6 | 0.15 | 0.35 | 3.6 | 7 |
| No. 8 | 1.8 | 0.45 | 0 | 1.8 | longer than 10 |
| No. 9 | 1.8 | 0.45 | 0.15 | 12.5 | 7 |
| No. 10 | 1.8 | 0.35 | 0 | 1.6 | longer than 10 |
| No. 11 | 1.8 | 0.35 | 0.25 | 11.1 | 8 |
| No. 12 | 1.8 | 0.35 | 0.2 | 8.8 | 9 |
| No. 13 | 1.8 | 0.26 | 0.3 | 8.0 | 10 |

As shown in Table 1, the Cl-free glasses (No. 1, 8 and 10) and the glass (No. 5) having a β-OH value of 0.25 mm⁻¹ and a Cl content of 0.15 mass % had a bubble growth rate of 2 or less, and therefore, the longest rising distance was longer than 10 m.

On the other hand, of the Cl-containing glasses, the glasses (No. 2 to 4, 6, 7, 9 and 11 to 13) except for No. 5 had a bubble growth rate of 3 or more, and therefore, the longest rising distance was 10 m or less.

From the results, in the glass of the Example of the present invention, it is not necessary to increase the size of a vacuum degassing apparatus in the case of producing a large-sized glass substrate efficiently. Thus, the problem of increasing equipment cost can be solved. In addition, the bubble density in the substrate can be reduced. Thus, the problem that a product yield decreases as the substrate size increases is expected to be solved.

INDUSTRIAL APPLICABILITY

The alkali-free glass substrates can be used for liquid crystal displays, organic EL displays, flat panel displays and other various applications.

While the present invention has been described in detail and with reference to specific embodiments thereof, it will be apparent to one skilled in the art that various changes and modifications can be made therein without departing from the spirit and scope of the present invention.

This application is based on Japanese Patent Application No. 2017-179684 filed on Sep. 20, 2017, the contents of which are incorporated herein by way of reference.

DESCRIPTION OF REFERENCE NUMERALS AND SIGNS

1: Glass production apparatus
10: Melting tank
20: Vacuum degassing apparatus
21: Vacuum housing
22: Vacuum degassing vessel
23: Uprising pipe
24: Downfalling pipe
25: Heat insulating material

The invention claimed is:

1. An alkali-free glass substrate, comprising, as represented by mass % based on oxides,
from 54% to 66% of $SiO_2$,
from 10% to 23% of $Al_2O_3$,
from 0% to 12% of $B_2O_3$,
from 0% to 12% of MgO,
from 0% to 15% of CaO,
from 0% to 16% of SrO,
from 0% to 15% of BaO, and
from 8% to 26% of MgO+CaO+SrO+BaO,
wherein a diameter of a grown bubble is at least 3 times greater than a diameter of an initial bubble,
wherein the alkali-free glass substrate has a β-OH value of from 0.15 to 0.5 mm⁻¹ and a Cl content of from 0.1 to 0.35 mass %,
wherein the diameter of a grown bubble and the diameter of an initial bubble are determined as follows:
the alkali-free glass substrate is melted, and while holding a temperature at 1400° C., reduced pressure is applied from an atmospheric pressure to 33.33 kPa at a constant pressure reduction rate for 20 minutes and held at 33.33 kPa for 5 minutes,
wherein the initial bubble is a bubble having a diameter of 0.1 to 0.3 mm contained in a molten glass at 1400° C. before starting the pressure reduction,
the grown bubble is a bubble, corresponding to the initial bubble, after the holding at 33.33 kPa for 5 minutes.

2. The alkali-free glass substrate according to claim 1, wherein the $B_2O_3$ content is 5% or less as represented by mass % based on oxides.

3. The alkali-free glass substrate according to claim 1, having the β-OH value of from 0.35 to 0.5 mm⁻¹.

4. The alkali-free glass substrate according to claim 1, having a strain point of 650° C. or higher.

5. The alkali-free glass substrate according to claim 1, having a strain point of 680° C. or higher.

6. The alkali-free glass substrate according to claim 1, having a sheet thickness of 0.45 mm or less.

7. The alkali-free glass substrate according to claim 1, wherein the substrate has a short side of 2100 mm or larger and a long side of 2400 mm or larger.

8. The alkali-free glass substrate according to claim 1, wherein the substrate has a short side of 2900 mm and a long side of 3200 mm or more.

9. The alkali-free glass substrate according to claim 1, wherein the diameter of the grown bubble is not more than 20 times the diameter of the initial bubble.

* * * * *